United States Patent [19]

Newcomb et al.

[11] Patent Number: 5,679,200

[45] Date of Patent: Oct. 21, 1997

[54] PROCESS AND APPARATUS FOR PRODUCING LAMINATED MATERIALS

[75] Inventors: Peter Michael Newcomb; Mark Jeremy Rowland; Harjap Singh, all of Oxfordshire; Allen Christopher Treadgold, Berkshire, all of United Kingdom

[73] Assignee: Carnaudmetalbox plc, United Kingdom

[21] Appl. No.: 525,721

[22] PCT Filed: Mar. 17, 1994

[86] PCT No.: PCT/GB94/00537

§ 371 Date: Dec. 8, 1995

§ 102(e) Date: Dec. 8, 1995

[87] PCT Pub. No.: WO94/21457

PCT Pub. Date: Sep. 29, 1994

[30] Foreign Application Priority Data

Mar. 25, 1993 [GB] United Kingdom .................. 9306158

[51] Int. Cl.⁶ .................. B32B 15/08; B32B 31/26
[52] U.S. Cl. .................. 156/308.2; 156/309.9; 156/322; 156/324; 156/555
[58] Field of Search .................. 156/308.2, 309.9, 156/322, 324, 282, 555, 583.1

[56] References Cited

U.S. PATENT DOCUMENTS

| | | |
|---|---|---|
| 3,679,513 | 7/1972 | Addinall et al. |
| 4,289,559 | 9/1981 | Murphy. |
| 4,748,070 | 5/1988 | Beechler .................. 156/290 |
| 5,093,208 | 3/1992 | Heyes .................. 156/309.9 |
| 5,238,517 | 8/1993 | Heyes .................. 156/244.27 |

FOREIGN PATENT DOCUMENTS

| | | |
|---|---|---|
| 281339 | 2/1988 | European Pat. Off. . |
| 312302 | 10/1988 | European Pat. Off. . |
| 312303 | 10/1988 | European Pat. Off. . |
| 312304 | 10/1988 | European Pat. Off. . |
| 402004 | 5/1990 | European Pat. Off. . |
| 51960 | 6/1992 | European Pat. Off. . |
| 1269786 | 8/1967 | United Kingdom . |
| 1237413 | 11/1967 | United Kingdom . |
| 1220080 | 12/1967 | United Kingdom . |
| 1220080 | 1/1971 | United Kingdom . |

*Primary Examiner*—Daniel Stemmer
*Attorney, Agent, or Firm*—Diller, Ramik & Wight, PC

[57] ABSTRACT

A process for producing laminated materials in which one or more polymer films are laminated to a metal strip by a combination of heat and pressure. Generally, polymer films are applied to both sides of the metal strip in a lamination nip which exerts a force of at least 15 kN/m. The nip rolls may also be at different temperatures, either by one nip roll being of conducting material such as steel and the other nip roll being of insulating material, or by actively cooling one of the rolls. This enables films having different softening temperatures to be laminated without risk of microblistering or of pick-up on the rolls.

10 Claims, 5 Drawing Sheets

PROCESS AND APPARATUS FOR PRODUCING LAMINATED MATERIALS

This invention relates to a process and apparatus for producing a laminated metal sheet or strip. In particular, it relates to a thermal lamination process for laminating a polymer film to a metal strip.

Thermal lamination of polypropylene films to metal strip, or sheet, is known from GB-1324952, for example, for imparting corrosion resistance to the metal strip. Simultaneous lamination of composite polyester films to each major surface of a metal strip is taught in EP-0312303 and simultaneous lamination of a polyester film to one side of a metal strip and a polyolefin or polyamide-containing film to the other side is described in EP-0312302.

Simultaneous lamination is achieved by applying one or more polymer films to a metal strip at a first temperature or laminating temperature $T_1$ which does not damage the outer surface of the polymer film(s) as the metal strip and polymer film(s) pass through a lamination nip. There is, however, a limit to this metal temperature, because excessive heat will cause the polymer film to stick to the laminating nip roll. This is known as "pick-up".

Polyester films, in particular, suffer micro-blistering at production laminating speeds. Whilst these defects are not thought to affect the integrity of the PET film, they detract from the appearance and thus the commercial viability of the film. Such micro-blistering can be avoided by increasing the lamination temperature but this may then lead to sticking, or pick-up, of the film on the laminating roll.

Pick-up is more pronounced for polypropylene film and will start to occur above a laminating temperature $T_1$ of only 180° C., dependent on the film gauge. When thin polypropylene is to be laminated to one side of a metal sheet with polyester, such as PET, simultaneously laminated to the other side of the metal sheet, pick-up of the polypropylene will occur if the laminating temperature is only 180° C., but micro-blistering of the PET film will start to occur at lower temperatures than 180° C.

This tendency to form micro-blisters under the polymer film is particularly pronounced when the metal sheet has high surface roughness values and varies according to the type and gauge of film used. It is believed that blistering arises due to air trapped beneath a film, particularly when the metal sheet has high surface roughness.

There is therefore a need for a lamination process which does not lead to micro-blistering of a polymer film or to pick-up of a polymer film on the laminating roll.

According to the present invention, there is provided a process for producing a laminate of strip metal and a polymeric film comprising the steps of: heating the metal strip to a first temperature $T_1$ above the initial adhesion point of the polymeric film; applying the polymeric film to the preheated metal by passing the metal and film between nip rolls; reheating the metal laminate to a second temperature $T_2$ to cause the film to interact with and bond to the metal sheet; and quenching the laminate rapidly and uniformly; in which the laminating nip rolls impose a nip force in excess of 15 kN/m.

Previous commercial lamination processes, such as those described in EP-0312302 and EP-0312303, have used a lamination nip force of up to 12.5 kN/m. The use of higher nip forces as in the present invention is particularly advantageous when the polymer film is of polyester, particularly polyester having pigment therein, since these forces have been found to reduce and/or eliminate micro-blistering under the polyester film which arises when commercial lamination speeds of 30 m/min and above are used.

Typically, polyester films of 15 μm thickness for clear polyester and 25 μm thickness for pigmented polyester were used but blistering arose both above and below these values when commercial lamination speeds were used.

The problem of microblistering has not been apparent before since lower line speeds were used. Furthermore, nip forces were limited by the apparatus used, heavier duty equipment being both bulkier and more expensive.

Micro-blistering may be due to lack of intimate contact between a metal sheet and a polymer film and can be alleviated by the use of higher nip forces.

Preferably, the lamination nip comprises an insulating roll and a conducting roll. Usually, the insulating roll is rubber coated and the conducting roll is of metal, preferably steel.

The conducting roll may also be cooled, for example by air directed onto the roll or by water which may pass directly or in a zig-zag manner through the roll. Previously, both laminating nip rolls have been rubber coated. As a result, when thin polypropylene films are laminated at a temperature $T_1$ in excess of 180° C. the film starts to pick up on the laminating roll. Thin polypropylene films are generally less than about 100 μm thick. The product quality of laminates which have been subject to such pick-up is not acceptable.

When a conducting roll is used, particularly on the side of a metal sheet to be coated with polypropylene, when polypropylene film is used, it was surprisingly found that laminating temperatures of up to 220° C. were possible without pick-up.

Preferably, the laminating nip rolls impose a force of at least 25 kN/m. The nip, or lamination, force is usually 40 kN/m but forces of up to 125 kN/m and above are also possible. This could be advantageous as production speeds are increased.

Preferably, the nip force is applied to both of the rolls by means of pneumatics although hydraulics, for example, may be more advantageous when loads in excess of 40 kN/m are to be applied.

The first temperature $T_1$, or laminating temperature, may be up to 220° C.

In a preferred embodiment, there are two polymer films applied to the metal strip, one on each major surface, or side, of the metal strip. There may be a polyester film on one side of the metal strip and a polypropylene film on the other side, for example. It is preferable that a thermally conducting roll be used on the side of the polymer film having the lower melting point. In this example, a conducting roll would be used on the polypropylene side of the metal strip in the laminating nip and a conventional rubber-coated roll on the polyester side.

In an alternative embodiment, cast polypropylene film may be used on one side and oriented polypropylene film on the other side of the metal strip. It has not been possible to use a combination of oriented polypropyene and cast polypropylene before now since the cast polypropylene tends to stick to the laminating roll at temperatures which are necessary for lamination using oriented polypropylene. Thus in this example, the conducting roll would be used on the cast polypropylene side of the metal strip and the insulating roll, or conventional rubber-coated, on the oriented polypropylene side.

According to a further aspect of the present invention, there is provided an apparatus for producing a laminated material comprising a polymer film bonded to a metal substrate, said apparatus comprising means for feeding a metal strip and a strip of polymer film to a lamination nip, means for heating the metal strip to a first temperature $T_1$ to cause initial adhesion of the polymer film to the metal strip, a sensor for monitoring the temperature $T_1$, means for adjusting nip force to at least 15 kN/m, means for reheating the resultant laminate to a second temperature $T_2$ to cause the film to interact with and bond to the metal strip and means for quenching the resultant laminate rapidly and uniformly.

The adjusting means preferably comprises pneumatics or hydraulics but simpler biasing means such as a spring in compression or tension may be used if precise loading levels are not required.

According to another aspect of the present invention, there is provided a process for producing a laminate of a first polymeric film, strip metal and a second polymeric film comprising the steps of: heating the metal strip to a first temperature $T_1$ above the initial adhesion point of the polymeric films; applying the polymeric films to the preheated metal by passing the metal and films between nip rolls, the first film being on one side of the metal strip and the second film being on the other side of the metal strip; reheating the metal laminate to a second temperature $T_2$ to cause the films to interact with and bond to the metal sheet; and quenching the laminate rapidly and uniformly; and in which the first film has a lower softening point than the second film and the nip rolls are at different temperatures, the nip roll on the side of the first film being at a lower temperature than the nip roll on the side of the second film.

The cooler roll may be a conducting roll such as chromium coated steel or stainless steel and the warmer roll may be an insulating roll. Alternatively, either roll may be actively cooled by air or cooling liquid. The air may be "blasted" onto the roll or cooling liquid may pass through the roll either directly or in a zig-zag manner. It is thus possible to laminate at a higher temperature than would normally be possible for films having different softening points without pick-up of one film occurring. Thus, for example, a high lamination temperature can be used for a PET/metal/polypropylene laminate without pick-up of the polypropylene or blistering of the PET.

In a still more preferred embodiment, the processes described above may be used in conjunction with a heat/cool zone as described in our copending PCT patent application no. WO94/21456. This heat/cool zone heats and/or cools the reheated laminate prior to quenching, whereby the laminate enters the quenching stage at a substantially constant temperature $T_3$, irrespective of line speed.

A preferred embodiment of process for producing a laminated metal strip will now be described, by way of example only, with reference to the drawings, in which: —

Figure 1:
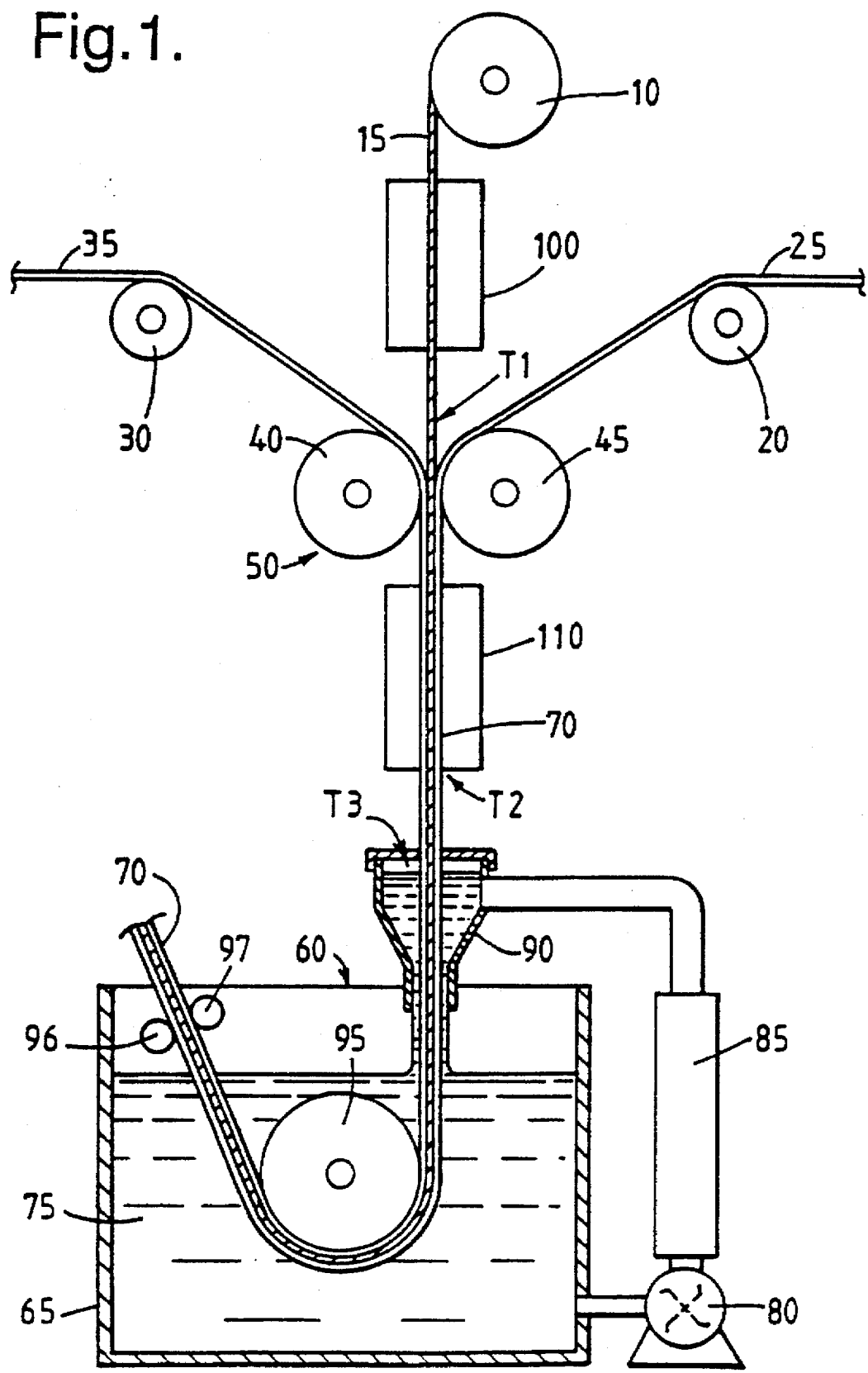
FIG. 1 shows an apparatus for laminating two polymer films to a metal substrate.

In FIG. 1 it can be seen that the apparatus comprises a first roll 10 over which a steel strip 15 is passed and second and third rolls 20, 30, over each of which a polymeric film strip 25, 35 respectively, is passed. Pinch rolls 40, 45 bring the steel strip 15 and polymeric film strips 25, 35 together in lamination nip 50 and quenching apparatus 60 immerses the resultant laminate 70 in a copious flood of cooling liquid in accordance with EP-B-0319309.

A preheater 100 is located between roll 10 and pinch rolls 40, 45 and serves to preheat the steel strip 15 to a temperature $T_1$ above the initial adhesion point of the film strips 25, 35 before laminating at the pinch rolls 40, 45. A second heater 110 reheats the laminate 70 to a temperature $T_2$ higher than the temperature $T_1$ at which the steel enters the nip rolls and higher than the melting point of the polymeric films 25, 35.

Generally, the laminate will then enter a heat/cool zone (not shown) which heats and/or cools the laminte to ensure that it enters the quenching apparatus 60 at a substantially constant temperature $T_3$, irrespective of line speed (see our copending patent application).

The quenching apparatus 60 comprises a reservoir 65 for containing a cooling liquid 75, a pump 80 to draw liquid from the reservoir 65, a heat exchanger 85 to cool liquid delivered by the pump and a trough 90 which receives cooled liquid from the heat exchanger 85. The laminate 70 passes through trough 90 and is entirely flooded edge to edge with cooled liquid.

The cooling liquid 75 travels with the laminate 70 on its coated surfaces from the trough 90 into the reservoir 65 so prolonging heat exchange to ambient. The laminate 70 passes around turn roll 95 and finally between wiper rolls 96, 97 which wipe off the cooling liquid.

Figure 2:
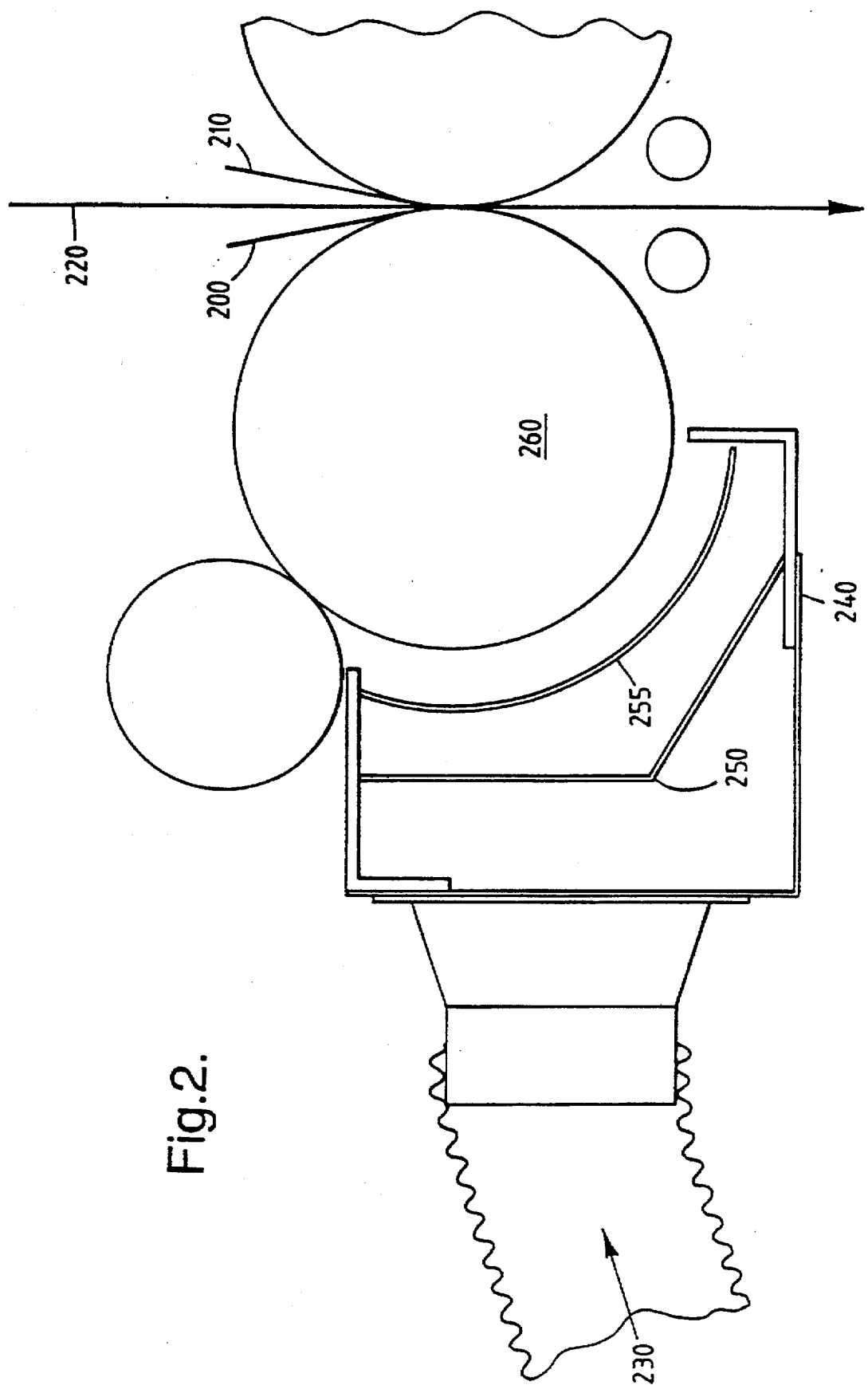
FIG. 2 is a cross section of an air cooling rig.

FIG. 2 shows an apparatus for cooling a rubber-coated nip roll by forced air. Cool air is blown by a fan into a cooling rig 240 which partially encloses one of the rubber-coated nip rolls 260. Air from the fan is blown through perforated plates 250, 255 and distributed across the width of the cooling rig 240 and onto the surface of the nip roll 260 adjacent to a polypropylene film 200. This enables the laminating temperature to be increased to avoid blistering of a PET film 210 simultaneously laminated to the other side of steel substrate 220 without causing the polypropylene film to adhere to the nip roll.

EXAMPLE 1

An original nip roll force of 12.5 kN/m exerted by rubber nip rolls was increased in an attempt to reduce blister levels on white PET when laminated to one side of a metal substrate in conjunction with lamination of a polypropylene film to the other side. Film surface roughness was used to quantify the extent of microblistering, rather than simply visual assessment.

Figure 3:
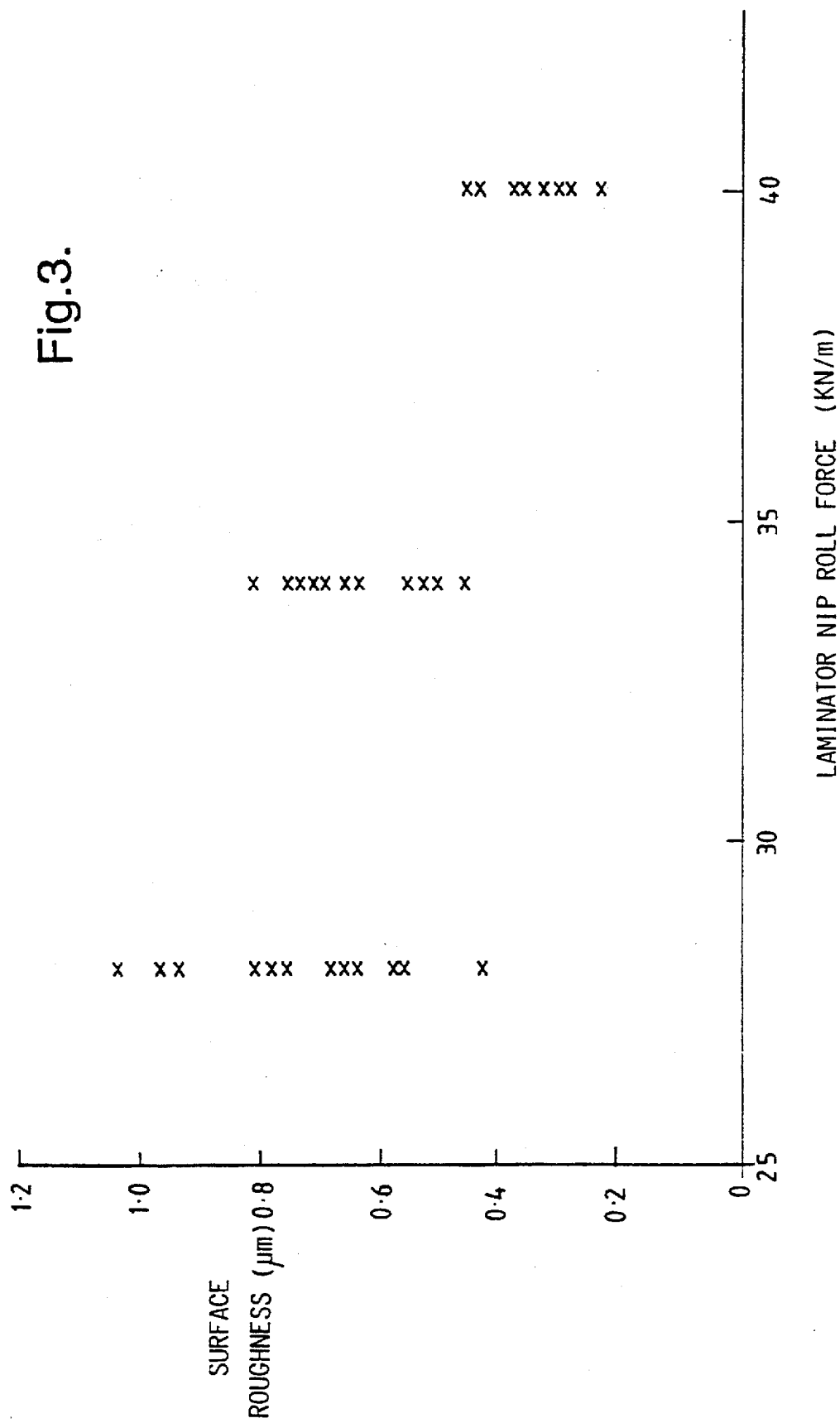
FIG. 3 is a graph of surface roughness against laminator nip roll force using rubber coated nip rolls.
Figure 4:
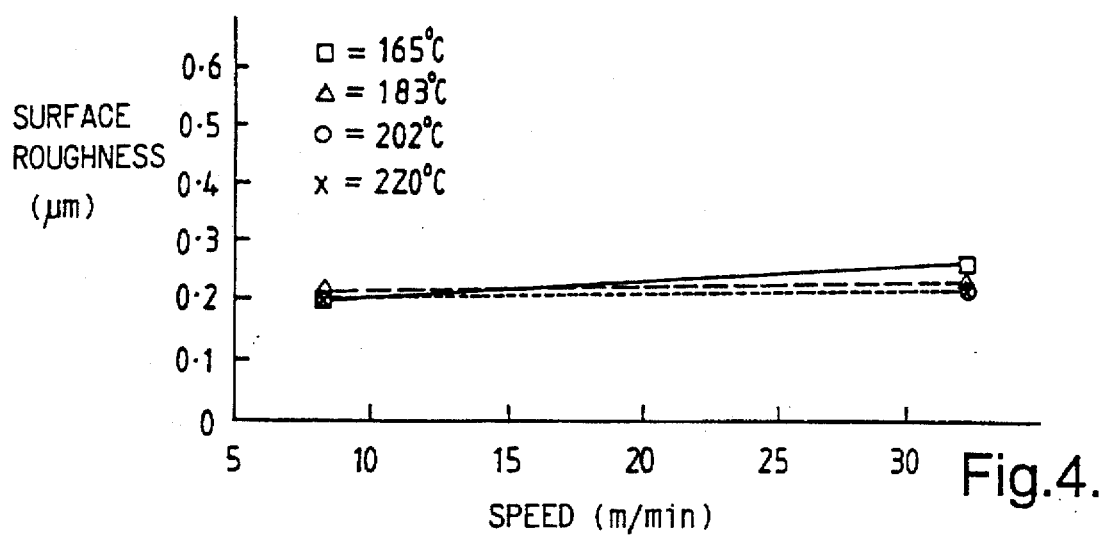
FIG. 4 is a graph of surface roughness against lamination speed showing speed-temperature interaction for 0.3×806 mm steel using one steel and one rubber-coated nip roll.
Figure 5:
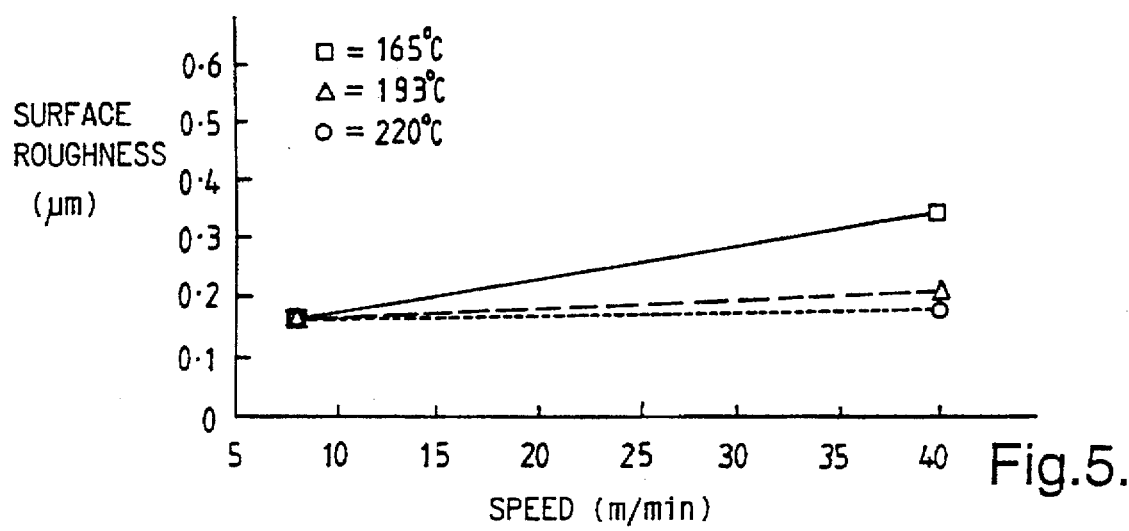
FIG. 5 is a like graph to FIG. 3 for 0.23×795 mm steel.
Figure 6:
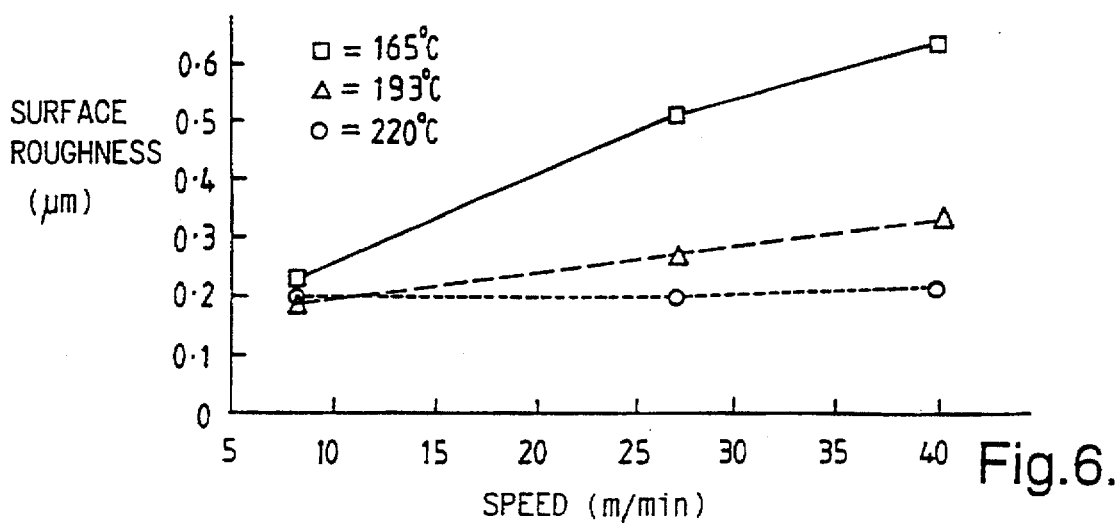
FIG. 6 is a like graph to FIGS. 3 and 4 for 0.17×795 mm steel.
Figure 7:
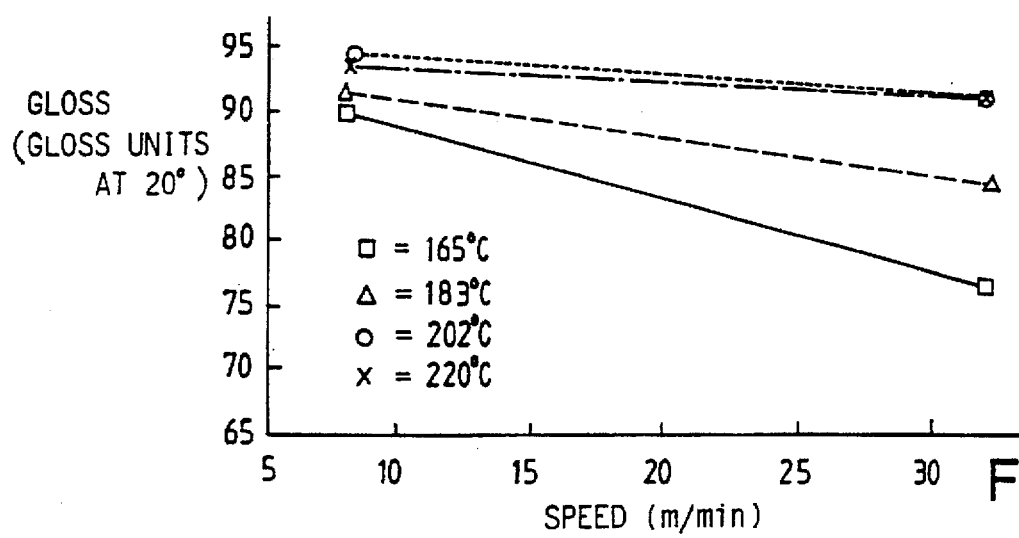
FIG. 7 is a graph of gloss against lamination speed showing speed-temperature interaction for 0.3×806 mm steel.
Figure 8:
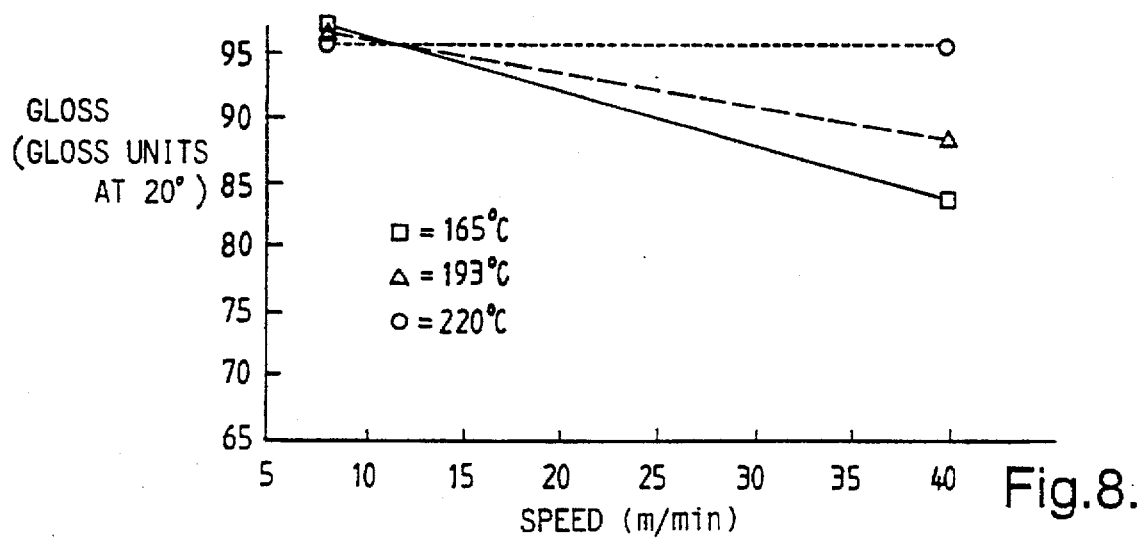
FIG. 8 is a like graph to FIG. 6 for 0.23×795 mm steel.
Figure 9:
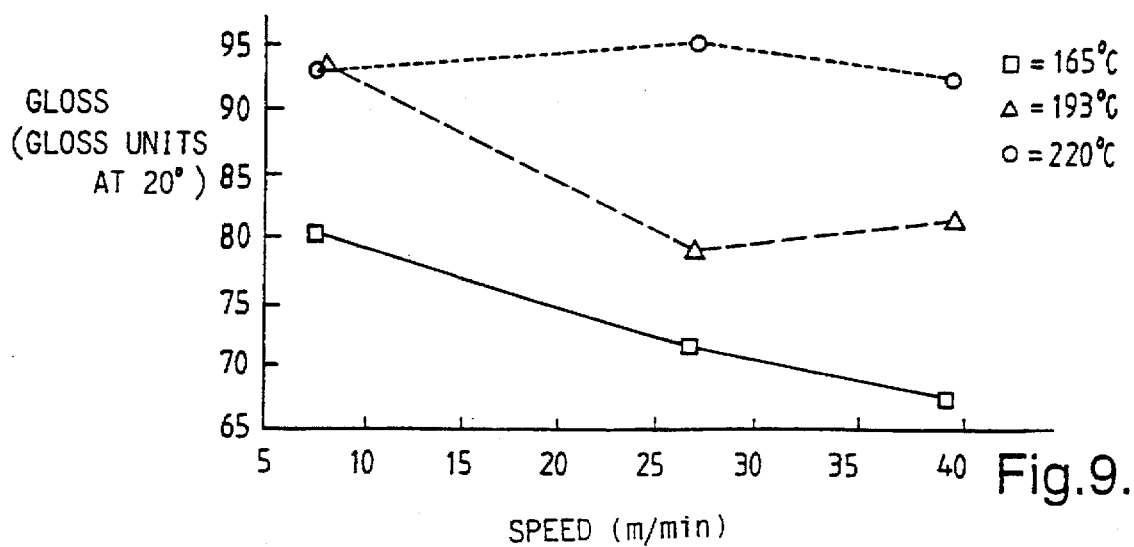
FIG. 9 is a like graph to FIGS. 6 and 7 for 0.17×795 mm steel.

With reference to FIG. 3, it can be seen that as the nip roll force was increased, there was a decrease in the level of blistering. This was apparent both visually and as measured surface roughness of the white PET film. Both the surface roughness and the range of these surface roughness values were reduced as the nip force was increased up to 40 kN/m. Mean surface roughness (Ra) values decreased from 0.73 μm to 0.34 μm. The appearance of the product was also improved.

Furthermore, the actual range of surface roughness values for each nip roll force decreased from 0.61 to 0.23 μm so that a greater consistency of laminate quality was attained for increased nip roll force.

Lamination speeds were also increased from 20 m/min to 40 m/min without loss of surface quality, i.e. occurrence of microblistering as measured by surface roughness of the polymer film when higher nip forces were applied.

It was thought that increase in nip force might lead to an increase in temperature of the rubber-coated rolls. Surface temperature of the rolls was monitored at nip forces of 28 kN/m and 40 kN/m after 30 minutes running time but no increase in the temperature of the rubber coating was recorded.

EXAMPLE 2

A series of trials were carried out using one water-cooled steel roll and one rubber coated roll in the laminator. Pre-heat temperature, nip roll force and line speed were adjusted to determine the optimum parameters for minimisation of blistering of PET films.

A laminate having clear polypropylene on one side of a steel substrate and white PET on the other side was manufactured. The steel nip roll was fitted in the side of the laminator which was to receive the polypropylene film.

In a first trial, steel strip having a width of 847 mm (commercial width) and 0.31 mm gauge was laminated with 830 mm wide white PET film of 25 μm gauge and 826 mm wide clear polypropylene of 40 μm gauge. Water cooling was connected to flow through the steel laminating roll and line speed increased to 32 m/min. The temperature of lamination $T_1$ could be increased to 220° C.

A second trial was carried out whilst varying speed, nip roll force, steel gauge and temperature. Roughness of the white PET surface was measured. Surface roughness and gloss were used as indicators of blistering levels of the PET film. As the level of blistering increased so did surface roughness, whilst the gloss level decreased. Details of parameter interaction are shown in FIGS. 4 to 9, each trial being conducted using one water-cooled steel roll and one rubber-coated roll.

At low speeds (8 m/min) there was no blistering, irrespective of the pre-heat exit temperature. Mean surface roughness was low and gloss high. At increased speeds, blistering increased. The temperature $T_1$ (see FIG. 1) was then raised from 165° C. to 200° C., which reduced blistering.

At line speeds of 8 m/min there was no need to raise the temperature $T_1$ to avoid blistering but as line speed increased it was necessary to raise the temperature $T_1$ in order to reduce blistering. At speeds in excess of 25 m/min, the temperature had to be approximately 200° C. to ensure low levels of blistering.

Nip roll force did not have as significant an effect when using a steel nip roll as was observed when using two rubber coated rolls.

It was possible to use less expensive steel strip when using the process of the present invention. Stone finish tin free steel could be used rather than the more expensive bright finish steel which was hitherto required in order to reduce blistering. It is envisaged that in alternative embodiments different polymers may be used from those described in the specific examples and benefits additional to avoidance of blistering can be achieved, such as the use of oriented polypropylene film with cast polypropylene film.

We claim:

1. A process for producing a laminate of strip metal and a polymeric film comprising the steps of:

heating the metal strip to a first temperature $T_1$ above the initial adhesion point of the polymeric film;

applying the polymeric film to the preheated metal by passing the metal and film between nip rolls thereby forming a metal laminate;

heating the metal laminate to a second temperature $T_2$ above the first temperature $T_1$ to cause the film to interact with and bond to the metal sheet;

quenching the laminate rapidly and uniformly; and the laminating nip rolls impose a nip force in excess of 15 kN/m.

2. A process according to claim 1, in which the nip rolls impose a nip force of at least 25 kN/m.

3. A process according to claim 1 or claim 2, in which a second polymeric film is laminated to the strip metal in which the heating of the metal strip to the first temperature $T_1$ is also above the initial adhesion point of the second polymeric film;

the second polymeric film is applied to the preheated metal by passing the metal and both films between nip rolls, the first film being on one side of the metal strip and the second film being on the other side of the metal strip;

the heating of the metal laminate to the second temperature $T_2$ also causes the second film to interact with and bond to the metal strip; and the quenching step quenches both films of the laminate rapidly and uniformly;

and the first film has a lower softening point than the second film, the nip rolls are at different temperatures, and the nip roll on the side of the first film being at a lower temperature than the nip roll on the side of the second film.

4. A process according to any one of claims 1 to 3, in which the nip rolls comprise an insulating roll and a conducting roll.

5. A process according to any one of claims 1 to 3, in which one nip roll is actively cooled.

6. An apparatus for producing a laminated material comprising a polymer film bonded to a metal substrate, said apparatus comprising:

means for feeding a metal strip and a strip of polymer film to a lamination nip;

means for heating the metal strip to a first temperature $T_1$ to cause initial adhesion of the polymer film to the metal strip thereby forming a laminate;

a sensor for monitoring the temperature $T_1$;

means for heating the resultant laminate to a second temperature $T_2$ above the first temperature $T_1$ to cause the film to interact with and bond to the metal strip;

means for quenching the resultant laminate rapidly and uniformly; and means for adjusting the nip force to at least 15 kN/m.

7. A process for producing a laminate of a first polymeric film, strip metal and a second polymeric film comprising the steps of:

heating the metal strip to a first temperature $T_1$ above the initial adhesion point of the polymeric films;

applying the polymeric films to the preheated metal by passing the metal and films between nip rolls thereby forming a metal laminate, the first film being on one side of the metal strip and the second film being on the other side of the metal strip;

heating the metal laminate to a second temperature $T_2$ above the first temperature $T_1$ to cause the films to interact with and bond to the metal sheet;

quenching the laminate rapidly and uniformly;

the first film has a lower softening point than the second film, the nip rolls are at different temperatures, and the nip roll on the side of the first film being at a lower temperature than the nip roll on the side of the second film.

8. A process according to claim 7, in which the cooler roll is a conducting roll and the warmer roll is an insulating roll.

9. A process according to claim 7, in which the cooler roll is actively cooled.

10. A process according to claims 1, 2, 7, 8 or 9, further comprising heating and/or cooling the heated laminate prior to quenching, whereby the laminate enters the quenching stage at a substantially constant temperature $T_3$, irrespective of line speed.

* * * * *